US005756223A

United States Patent [19]

Cameron et al.

[11] Patent Number: 5,756,223
[45] Date of Patent: May 26, 1998

[54] COATED ARTICLE

[75] Inventors: Donald S. Cameron, Emmer Green; Duncan R. Coupland, High Wycombe; Alison Twitty, Pewsey, all of United Kingdom

[73] Assignee: Johnson Matthey Public Limited Company, London, United Kingdom

[21] Appl. No.: 409,404

[22] Filed: Mar. 24, 1995

[30] Foreign Application Priority Data

Mar. 25, 1994 [GB] United Kingdom ............. 9405934

[51] Int. Cl.$^6$ ................................................. B32B 9/00
[52] U.S. Cl. ................. 428/688; 428/689; 428/697; 428/699; 428/701; 428/702; 428/632; 428/633
[58] Field of Search ................. 428/688, 689, 428/697, 698, 699, 701, 702, 632, 633; 416/241 R, 241 B

[56] References Cited

U.S. PATENT DOCUMENTS

| | | | |
|---|---|---|---|
| 3,113,885 | 10/1963 | Teague | 428/215 |
| 3,890,456 | 6/1975 | Dils | 428/216 |
| 4,159,353 | 6/1979 | Adelsberg et al. | 427/454 |

FOREIGN PATENT DOCUMENTS

| | | |
|---|---|---|
| 349925A | 1/1990 | European Pat. Off. . |
| 0471505 | 2/1992 | European Pat. Off. . |
| 471505A | 2/1992 | European Pat. Off. . |
| 0559330 | 9/1993 | European Pat. Off. . |
| 583009A | 2/1994 | European Pat. Off. . |
| 609795A | 8/1994 | European Pat. Off. . |
| 2084651 | 12/1971 | France . |
| 4326143 | 12/1993 | Germany . |
| 872445 | 7/1961 | United Kingdom . |

OTHER PUBLICATIONS

Darling, A.S., and Selman, G.L., "The Mechanism of Failure at High Temperatures", Platinum Metal Review, 1968, vol. 12, pp. 92–98.
Platinum Metal Review, "Diffusion in Platinum–clad Molybdenum. Limitations on High–Temperature Applications", 1962, vol. 6, p. 147.

*Primary Examiner*—Timothy Speer
*Attorney, Agent, or Firm*—Watson Cole; Stevens Davis, P.L.L.C.

[57] ABSTRACT

An article for use at high temperatures and in corrosive environments comprising a substrate of refractory metal or alloy thereof. The substrate is coated with an interlayer followed by an optional preliminary coating and a final coating of a platinum group metal. The interlayer reduces oxidation of the substrate and prevents metallic interdiffusion between the final coating and substrate contributing both to an improved tolerance of the article to the working environment and reduced manufacturing costs.

23 Claims, No Drawings

COATED ARTICLE

This invention relates to an article for use at high temperatures and in corrosive environments and in particular to a protected article. This invention also relates to a method of coating metallic substrates.

The glass manufacturing industry has a particular need for materials and apparatus which have both good stability at high temperatures and good corrosion resistance to molten glass. Examples of such apparatus are crucibles, mixing stirrers, crown spinners, gobbing stirrers, thermocouple sheaths etc. The difficulties encountered with apparatus which either contacts molten glass or the atmosphere above the molten glass are the high temperatures, of the order of 1000°–1600° C., the viscosity and abrasiveness of the molten glass and the reactivity of the glass and its vapour. Molten glass will attack, for example crucibles or containers in which it is held, and this attack is most pronounced at the glass line where the glass and air interface and the surface of the glass contacts the crucible or container wall. With time the glass attacks the wall of the apparatus, eg crucible or container and forms a hollow at the glass line. Furthermore, as a result of the reactivity of the glass, small fragments of the apparatus in contact with glass may break off and contaminate the glass. This is a particular disadvantage when the glass is being used for high quality products such as cathode ray displays which should have no visible defects. The chemical attack by the molten glass may also result in metals or compounds being leached into the glass, which results in undesirable discolouration, or there may be a simple change in composition leading to variations of refractive index within the final product. This is particularly a problem for optical glass where the aesthetics require high uniformity of light transmittance.

Apparatus for use in the glass industry is often fabricated from transition or refractory metals or alloys such as nickel alloys or metals or alloys of molybdenum, tantalum, etc in order to provide apparatus with a reasonable time period in service. PGM's or alloys thereof have also been used as the material for such apparatus since these metals and alloys have good corrosion resistance to molten glass and good thermal stability. Platinum group metals (PGMs), include platinum, palladium, iridium, rhodium, ruthenium and osmium. However, the one major disadvantage with using platinum group metals is the high cost of the material itself. To overcome the disadvantage of having apparatus fabricated solely from platinum group metals and alloys, apparatus is made with a metallic substrate that is coated or clad therewith, in particular with platinum. In order to provide effective protection the coating or cladding must be of sufficient thickness to protect the substrate for an adequate service life. These coatings or claddings provide some protection and enable the service life to be increased. The coating or cladding of platinum however, does not prevent the major problem of ingress of oxidants through to the substrate which results in corrosion of the substrate.

It is well established that apparatus fabricated from molybdenum must be protected for uses where contact with free air or oxygen bearing environments at temperatures in excess of approximately 400° C. is likely or even possible due to the volatility of the oxide formed. Such environments include use in the glass industry or waste vitrification.

Platinum-clad molybdenum apparatus is extensively employed for the industrial handling of molten glass, and at temperatures up to 1200° C. can be relied upon for many months of useful service. There are many applications for platinum-coated molybdenum, notably lead-throughs for electric lighting, where electro-deposited platinum group metals provide oxidation resistance for the very short time these components are at high temperature during manufacture.

The traditional solution for use of such articles at higher temperatures has been the use of platinum or platinum group metal alloy claddings as the environmental protection. These claddings or sheaths are discrete separate layers formed mechanically into the desired shape, and are usually more than 1000 microns in thickness and for complex shapes require substantial specialised fabrication. It has become normal to interpose a layer of ceramic, often alumina between the PGM and molybdenum substrate, and it has been demonstrated that improved durability of articles especially those operating at greater than about 1030° C., can be achieved by evacuating or displacing with inert gas, the air from between the cladding and the refractory ceramic. This manufacturing process is particularly expensive.

Increased operating temperatures, however, accelerate breakdown of the platinum-cladding and although platinum-clad molybdenum still represents the best combination of metals acceptable to the glass manufacturer for high strength use above 1030° C., premature failures in this elevated temperature range tend to occur in a rapid and characteristic manner. Large distortions of the cladding occur at an early stage, the article develops a "blistered" appearance, and the eventual cracking and failure of the cladding leads to catastrophic oxidation of the molybdenum core.

The mechanism of the breakdown of the sheath has been investigated (Platinum Metal Review, 1968, vol 12, p 92–98. "Platinum-clad Equipment for Handling Molten Glass", Darling, A S and Selman, G L,) and has been shown to involve a volatile oxide of molybdenum, deposits of which were located on the inside of the platinum sheath.

Experiments have shown that molybdenum migration to the platinum was not inhibited by the presence of an incomplete vacuum between platinum and molybdenum, but that this metal migration was found to be significantly inhibited by sealing the article in a hard vacuum. Further molybdenum transfer was considerably reduced by keeping the pressure within the interfacial volume (below $10^{-3}$ Torr) where the direction of metal migration appeared to be from platinum to the molybdenum, although the rate of transfer was very slow. In the presence of the alumina barrier layer, which had no beneficial effect on metal transfer when the gas pressure was high, the migration of molybdenum to platinum appeared to be encouraged when the gas pressure was low.

A second approach (Platinum Metal Review, 1962, vol 6, p 147. "Diffusion in Platinum-clad Molybdenum. Limitations on High-Temperature Applications") suggests that to apply an electro-deposited coating of rhenium to the molybdenum with the coating acting as a barrier layer, reduces oxidation of the molybdenum. Adhesion of the rhenium to the molybdenum is accomplished by annealing in hydrogen or in vacuum at a high temperature.

European published patent application number 0471505 A, in the name of Johnson Matthey PLC, discloses an article which is for use in high temperature corrosive environments and which is protected by several successive coatings. The coatings comprise:

i) a first coating of one or more metals or alloys;
ii) an optional second coating of a mixture of one or more ceramics and one or more metals or alloys;
iii) a third coating of one or more ceramics, and
iv) a fourth coating of one or more precious metals or alloys thereof, the fourth coating being substantially non-porous.

The advantages of this protection by several successive coatings is that the article has improved corrosion resistance and heat stability, together with reducing the diffusion of oxidants through to the substrate.

European published patent application number 0559330 A in the name of Johnson Matthey PLC discloses a ceramic article for use at high temperatures and in corrosive environments. The article comprises a ceramic substrate on which is deposited a substantially non-porous coating of one or more precious metals or alloys thereof. The advantage of a substantially non-porous coating on a ceramic article is increased durability when used at high temperatures and in corrosive environments.

The aim of this invention is to improve molybdenum durability by using coating deposition technology.

This invention provides an article for use at high temperatures and in corrosive environments, comprising a substrate of a refractory metal or nickel or iron or alloy thereof and on which is deposited successively:

i) an interlayer of ceramics and/or one or more metals or alloys thereof, said interlayer selected from chromia, alumina, magnesia, silica, or a mixture thereof or chromium, hafnium or alloys thereof, ii) an optional preliminary coating of ceramics, iii) a final coating of one or more of platinum group metals or alloys thereof, the coating being substantially non-porous.

The invention further provides a method of manufacture of an article comprising a substrate of refractory metal or nickel or iron or alloy thereof and depositing successively on the substrate, i) an interlayer of ceramics and/or one or more metals or alloys thereof, said interlayer being selected from chromia, alumina, magnesia, silica or a mixture thereof or chromium, hafnium or alloys thereof, ii) an optional preliminary coating of ceramics and iii) a final coating of one or more platinum group metals or alloys thereof, the coating being made substantially non-porous.

When the deposited interlayer is in the form of an oxide, the oxides of chromia, alumina and magnesia may be in the form of spinels. Alternatively, the deposited interlayer may be selected from, zirconia, molybdenum disilicide or a mixture thereof, zirconium, tungsten, or alloys thereof.

An advantage of the interlayer is to prevent oxidation of the substrate. An interlayer of pure metal can be of particular benefit because of its tendency to take up oxygen and also act as a barrier to prevent ingress of oxygen. Chromia provides an unexpected improvement to the reduction of the inter-diffusion of oxidants through to the substrate and is itself substantially stable with respect to platinum and platinum alloy final coatings. The interlayer may be material with a low oxide vapour pressure which is an oxygen getter material and which also fills cracks in the outermost coating to prevent ingress of oxygen.

Preferably the optional preliminary coating is selected from chromia, alumina, zirconia, magnesia, silica, aluminosilica, mullite, molybdenum disilicide or a mixture thereof. The preliminary coating is to control interdiffusion of the outermost coating with the molybdenum substrate.

Suitably, the final coating is selected from platinum or palladium or alloys thereof. Other PGM's, such as iridium, may be used as the final coating. Preferably when the preliminary coating is present, interlayer bonding has been promoted by heating under vacuum. This provides a further advantage that the substrate has an improved protection against diffusion of oxidants.

The interlayer may be deposited by flame or plasma spraying. Preferably, the optional preliminary coating is deposited by a technique selected from sol gel coating or dipping, and chemical or vapour deposition to achieve a thin layer of ceramics. Deposition of each preliminary coating should be performed under conditions designed to leave it with low levels of porosity and negligible interconnecting or through porosity.

The preliminary coating may be prepared either by one-shot processing or multistage reaction processing. It may contain random dispersions of metallic particulates designed to absorb or getter residual oxygen.

The final coating of one or more platinum group metals or alloys thereof may be deposited by flame or plasma spraying and chemical or physical vapour deposition, brush painting a "slurry", aqueous or fused salt electrolytic deposition, and electroless plating. Preferably the final coating is made substantially non-porous by an after-treatment such as described in EP 0471505 A and EP 0559330 A. Further treatments may also include flame, electron beam and laser glazing. The final coating may be finally subjected to a heat treatment under vacuum to promote interlayer bonding.

An advantage of this invention is the elimination of the "gap" between the PGM and the preliminary coating of the ceramic material. This will reduce the amount of air initially present within the system, to that below which the circulatory mechanism of molybdenum oxide transport to the platinum group metal or alloy surface can occur, without the need to resort to expensive and time-consuming evacuation procedures.

The absence of this air gap has been demonstrated by cutting transversely a molybdenum rod coated with a PGM. A platinum tube was slipped over the exposed surface, welded to the coating and a vacuum was applied, without indication of gas flow from the coated system.

The commercial advantage of improving the durability of platinum-clad molybdenum articles is quite clear and will be of particular advantage to the glass industry. Indeed, the invention can also be used on discrete areas of an article for example part coatings on molybdenum electrodes.

The invention will be described by examples which are illustrative but not limiting of the invention.

COMPARATIVE EXAMPLE (E-1)

A molybdenum substrate was supplied by Climax Special Metals and coated by flame spraying a platinum group metal (PGM) onto the substrate using propylene and oxygen to form the flame and compressed air to atomise the PGM. The PGM was in the form of a platinum wire and palladium wire each of which which was fed from a reel to the flame. The thickness of the platinum coating was 400 µm and of the palladium coating 100 µm. An after-treatment of vacuum heat treatment at 1200° C. for 4 hours was applied followed by shot peening at 8 psi.

EXAMPLES E2–E4

The molybdenum substrate was prepared in accordance with Comparative Example (E1) except that an interlayer was deposited on the substrate by plasma spraying and the final coating was platinum (500 µm). The deposition of the interlayer was carried out by Plasma Technik Ltd. The interlayer of E2 was chromia (200 µm), of E3 was tantalum (200 µm), of E4 was tantalum and alumina (200 µm).

EXAMPLE E5–E7

The molybdenum substrate was prepared in accordance with Comparative Example (E1) except that an after-treatment of shot peening was applied followed by a low temperature heat treatment at 950° C. for 160 hours.

The final coating of Examples E2–E4 was platinum having a thickness of 500 μm and of Example E5 was platinum and palladium having respective total thicknesses of 250 μm. The Example E6 had a final coating of palladium (100 μm) and platinum (600 μm) and palladium (100 μm). The final coating of Example E7 was palladium (400 μm) and platinum (400 μm).

Evaluation of samples prepared according to the Comparative Example. E01 and Examples E2–E7 was by air testing at 1300° C. for up to 1000 hours. The samples were weighed about every 150 hours, cut into sections and examined by standard metallography techniques and the results are set out in Table 1.

TABLE 1

| Sample | Substrate | Interlayer thickness (μm) | Coating thickness (μm) |
|---|---|---|---|
| E1 | Molybdenum | — | Pt (400) + Pd (100) |
| E2 | Molybdenum | $Cr_2O_3$ (200) | Pt (500) |
| E3 | Molybdenum | Ta (200) | Pt (500) |
| E4 | Molybdenum | Ta + $Al_2O_3$ (200) | Pt (500) |
| E5 | Molybdenum | — | Pd (125 μm) + Pt (250 μm) + Pd (125 μm) |
| E6 | Molybdenum | — | Pd (100 μm) + Pt (600 μm) + Pd (100 μm) |
| E7 | Molybdenum | — | Pd (400 μm) + Pt (400 μm) |

The following results were obtained after 624 hours at 1300° C.

E1

This system was fully protective of the molybdenum substrate for 500 hours. After this period small weight losses were evident demonstrating that oxidation of molybdenum had occurred. Also, diffusion of the molybdenum into the coating was observed. Interdiffusion between the Pt and Pd was evident. Kirkendall voiding within the final coating was observed due to differing diffusion rates between Pt and Pd.

The following results were obtained after 1000 hours at 1300° C. at which time the test was terminated to evaluate the samples.

E2

This system was fully protective of the molybdenum substrate for 1000 hours. There was no molybdenum degradation (determined by weight loss) evident in this system. There appeared to be no substantial interdiffusion between Pt/$Cr_2O_3$/molybdenum substrate. A thin layer of molybdenum oxide was evident between the $Cr_2O_3$ and the molybdenum substrate.

E3

This system was fully protective and there was no evidence by weight loss of molybdenum degradation. There was evidence of interdiffusion between the Ta/Pt/molybdenum substrate and some cracking of the final coating was evident in the diffusion zone.

E4

This system was fully protective and there was no evidence, by weight loss, of molybdenum degradation. An interaction between the alumina and the Pt where alumina was reduced to aluminium and was evidenced by diffusion of Al into the Pt coating. Interaction between the molybdenum substrate and the Ta interlayer was evident.

E5–E7

These systems are still on test after 824 hours at 1300° C. They have been fully protective and there has been no evidence, by weight loss, of molybdenum degradation.

It can be seen from the results that a system of protecting a molybdenum substrate using an interlayer is significantly more effective than in the absence of an interlayer. In addition, the system does not require evacuation, as is described in the prior art and which adds expense to the manufacturing costs. A system according to the present invention provides an improvement to the tolerance of an article to the working environment and reduced manufacturing costs.

We claim:

1. An article for use at high temperatures and in corrosive environments comprising a substrate of a substrate metal selected from the group consisting of a refractory metal, nickel, iron, and an alloy thereof, and on which is deposited successively:

i) an interlayer comprising an interlayer member selected from the group consisting of an interlayer ceramic and an interlayer metal:

(a) said interlayer ceramic being selected from the group consisting of chromia, alumina, magnesia, silica, zirconia, molybdenum disilicide, a mixture of zirconia and molybdenum disilicide, and a mixture of at least two members of the group consisting of chromia, alumina, magnesia, and silica;

(b) said interlayer metal being selected from the group consisting of chromium, hafnium, zirconium, tungsten, tantalum, titanium, an alloy of chromium and hafnium, and an alloy of zirconium and tungsten;

(c) wherein, when the interlayer metal is selected from the group consisting of tantalum and titanium, the substrate metal is selected from the group consisting of refractory metal and iron;

ii) a preliminary ceramic layer being deposited upon said interlayer when said interlayer member is said interlayer metal, said preliminary ceramic layer comprising a a preliminary layer ceramic selected from the group consisting of:

chromia, alumina, zirconia, magnesia, silica, aluminosilica, mullite, molybdenum disilicide and a mixture thereof, wherein, when the interlayer metal is selected from the group consisting of tantalum and titanium, the preliminary layer ceramic is selected from the group consisting of chromia and molybdenum disilicide; and iii) a final coating comprising a member selected from the group consisting of:

platinum group metals and alloys thereof, the final coating being substantially non-porous;

wherein said interlayer is deposited directly on said substrate to directly contact said substrate.

2. The article according to claim 1, wherein the interlayer ceramic is selected from the group consisting of zirconia, molybdenum disilicide, and a mixture thereof, and the interlayer metal is selected from the group consisting of zirconium, tungsten, and an alloy thereof.

3. The article according to claim 2, comprising the preliminary ceramic layer.

4. The article according to claim 3, wherein the final coating comprises a member selected from the group consisting of platinum, palladium, and an alloy thereof.

5. The article according to claim 4, wherein when the preliminary ceramic layer is present, interlayer bonding has been promoted by heating under vacuum.

6. The article according to claim 2, wherein the final coating comprises a member selected from the group consisting of platinum, palladium, and an alloy thereof.

7. The article according to claim 6, wherein when the preliminary ceramic layer is present, interlayer bonding has been promoted by heating under vacuum.

8. The article according to claim 1, wherein said interlayer ceramic is selected from the group consisting of chromia, alumina, magnesia, silica, and a mixture thereof, and said interlayer metal is selected from the group consisting of chromium, hafnium, and an alloy thereof.

9. The article according to claim 8, comprising the preliminary ceramic layer.

10. The article according to claim 8, wherein the final coating comprises a member selected from the group consisting of platinum, palladium, and an alloy thereof.

11. The article according to claim 10, wherein when the preliminary ceramic layer is present, interlayer bonding has been promoted by heating under vacuum.

12. The article according to claim 1, wherein the final coating is selected from the group consisting of platinum, palladium, and an alloy thereof.

13. The article according to claim 1, wherein when the preliminary ceramic layer is present, interlayer bonding has been promoted by heating under vacuum.

14. The article according to claim 1, wherein said interlayer consists essentially of said interlayer member.

15. The article according to claim 1, wherein when said interlayer metal is selected from titanium, then said interlayer consists essentially of titanium.

16. The article according to claim 1, wherein said interlayer comprises said interlayer ceramic.

17. The article according to claim 6, wherein said interlayer consists essentially of said interlayer ceramic.

18. The article according to claim 1, comprising said preliminary ceramic layer; and
the interlayer comprises said interlayer metal, wherein said interlayer metal is selected from the group consisting of chromium, hafnium, zirconium, tungsten, an alloy of chromium and hafnium, and an alloy of zirconium and tungsten.

19. The article according to claim 1, said interlayer consisting essentially of said interlayer metal, wherein said interlayer metal is selected from the group consisting of chromium, hafnium, zirconium, tungsten, an alloy of chromium and hafnium, and an alloy of zirconium and tungsten.

20. The article according to claim 1, comprising said preliminary ceramic layer, wherein said preliminary ceramic layer comprises a member of the group consisting of chromia, and molybdenum disilicide, and
said interlayer comprises said interlayer metal, wherein said interlayer metal is selected from the group consisting of tantalum and titanium.

21. The article according to claim 20, wherein said interlayer consists essentially of a member of the group consisting of tantalum and titanium.

22. An article for use at high temperatures and in corrosive environments comprising a member comprising a substrate, an interlayer and a final coating, wherein said interlayer is deposited directly on said substrate to directly contact said substrate, said member being selected from the group consisting of a first member and a second member:
said first member comprising said substrate, said interlayer and said final coating, wherein said interlayer is a ceramic-containing interlayer, and said ceramic-containing interlayer and said final coating are successively deposited upon said substrate;
said second member comprising said substrate, said interlayer, a preliminary ceramic layer, and said final coating, wherein said interlayer is a metal-containing interlayer, and said metal-containing interlayer, said preliminary ceramic layer, and said final coating are successively deposited upon said substrate:
said substrate comprising a substrate metal selected from the group consisting of refractory metal, nickel, iron, and an alloy thereof;
said ceramic-containing interlayer comprising an interlayer ceramic selected from the group consisting of chromia, alumina, magnesia, silica, a mixture thereof; zirconia, molybdenum disilicide, and a mixture of zirconia and molybdenum disilicide,
said metal-containing interlayer comprising an interlayer metal selected from the group consisting of chromium, hafnium, zirconium, tungsten, tantalum, titanium, an alloy of chromium and hafnium, and an alloy of zirconium and tungsten,
said preliminary ceramic layer comprising a preliminary layer ceramic selected from the group consisting of chromia, alumina, zirconia, magnesia, silica, aluminosilica, mullite, molybdenum disilicide, and a mixture thereof, and
said final coating comprising a member of the group consisting of platinum group metals and an alloy thereof, the final coating being substantially non-porous;
with the proviso that when said interlayer metal is selected from the group consisting of tantalum and titanium,
said preliminary layer ceramic is selected from the group consisting of chromia and molybdenum disilicide, and
said substrate metal is selected from the group consisting of refractory metal and iron.

23. The article according to claim 22, wherein when said interlayer metal is selected from titanium, then said metal-containing interlayer consists essentially of titanium.

* * * * *